May 29, 1934.   E. J. MURPHY   1,961,069
FREEZING APPARATUS
Filed Nov. 16, 1931
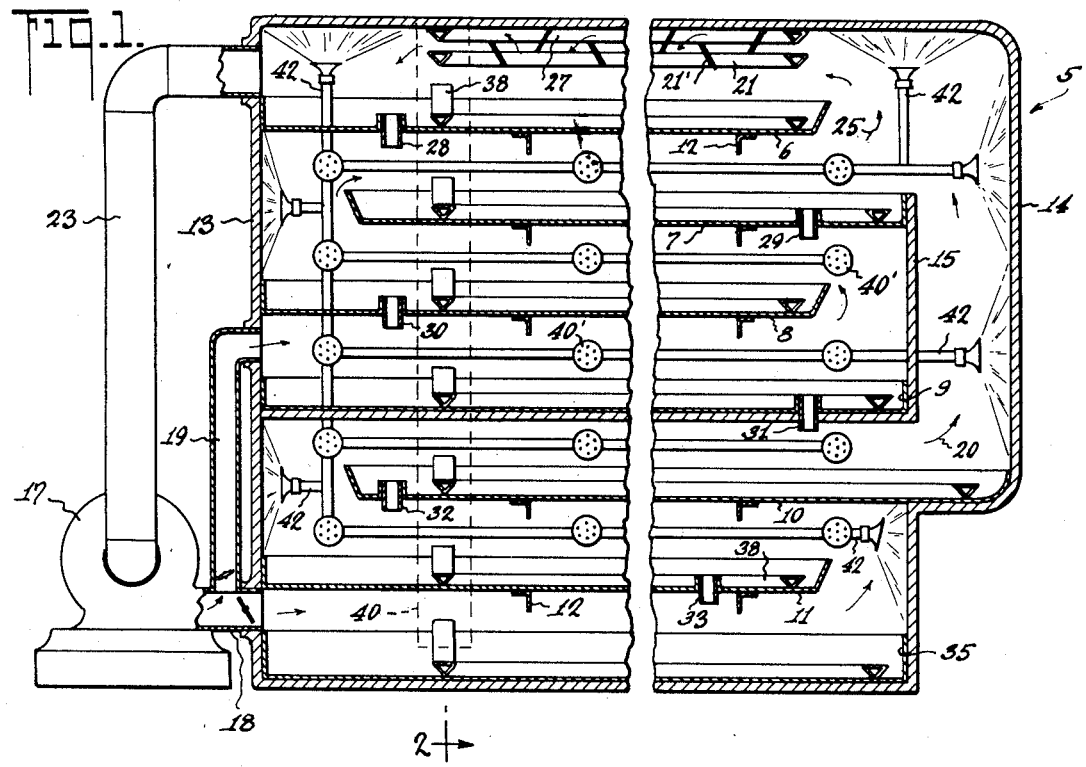
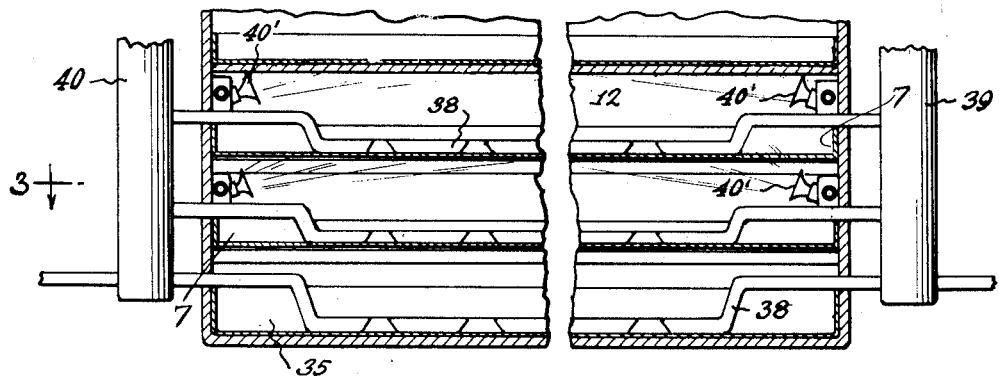
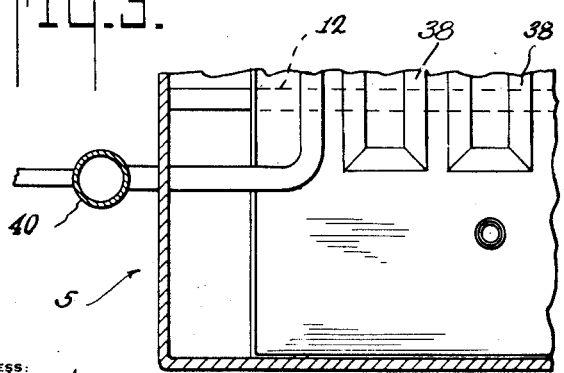
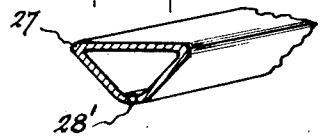
EDWARD J. MURPHY
INVENTOR
BY Victor J. Evans
ATTORNEY

UNITED STATES PATENT OFFICE 1,961,069

FREEZING APPARATUS

Edward Joseph Murphy, Lynbrook, N. Y.

Application November 16, 1931, Serial No. 575,367

4 Claims. (Cl. 62—95)

This invention relates to freezing apparatus and among the objects of the invention are to provide an apparatus particularly adapted for freezing of perishable commodities, so that they may be placed in the same for a short time and have their temperature reduced to such a point that it may be possible to then preserve them indefinitely in the customary manner; to provide a freezing apparatus so constructed and operated that the air content thereof is kept to the desirable low temperature; to provide an apparatus having pans for the support of the cooling agent and circulating means for the same, the pans being so arranged as to provide a sinuous air passage by which the air is kept to the desirable low point; and to provide an apparatus of this character which is generally of simple form and therefore susceptible of cheap manufacture.

Another object of the invention is the provision of the plurality of air passages in the freezing apparatus and means connected to these air passages for circulating air therethrough, said passages being connected in parallel with the mentioned means.

A further object of the invention is the provision of novel coils or tubes having a comparatively large area for contact with an object to be cooled or heated, according to the apparatus in which the same is used, so that the cooling or heating may be accomplished more readily and with greater efficiency.

A still further object of the invention is the provision of adjustable overflow pipes in pans employed in my freezing apparatus, for a purpose hereinafter mentioned.

A still further object of my present invention is the provision of overflow pipes in staggered arrangement whereby liquid employed in pans connected with the overflow pipes may flow substantially from one end of a pan to another and thereby increase the efficiency of the apparatus.

Another object of the invention is the provision of means for defrosting the pans employed in the freezing apparatus of my invention.

Another object is to provide means for defrosting the interior of the cabinet in which the cooling mechanism is housed.

The present invention is an improvement on that shown and described in my co-pending application entitled Freezing apparatus, filed October 5th, 1931, Sr. No. 567,009.

Other objects of the invention will be appreciated from a reading of the following specification.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therefrom as do not affect the spirit of the invention nor exceed the scope thereof as expressed in the appended claims.

In the drawing:

Fig. 1 is mostly a broken vertical section of one embodiment of my invention.

Fig. 2 is a section taken approximately on the line 2 of Fig. 1, looking in the direction of the arrows.

Fig. 3 is a section taken approximately on the line 3 of Fig. 2, looking in the direction of the arrows; and Fig. 4 is a fragmentary perspective view of a form of tube employed in the apparatus shown.

Referring to the drawing for a more detailed description thereof, the numeral 5 indicates a cabinet which contains a series of vertically spaced pans 6, 7, 8, 9, 10 and 11 supported on angle bars 12. The pans 6, 8, 9 and 11 extend to the end 13 of the cabinet and terminate short of the end 14 of the same. The pans 7 and 9 extend from a vertical partition 15 towards but do not reach the end 13 of the cabinet while the pan 10 extends from the side 14 of the cabinet and terminates short of the end 13 of the same. By arranging the pans as described there are formed two passageways through which air may be blown by a blower 17 which is connected with the cabinet by means of pipes 18 and 19, the latter branching from the former. The air blown through the cabinet between the pans may, if desired, be pre-cooled by any suitable apparatus. Air issuing from the pipe 18 flows under the pan 11 towards the right end of the same and continues upwardly and then to the left between the pans 11 and 10 and then around the left end of the same, continuing towards the right between hands 10 and 9 and then turning as indicated by the arrow 20 to rise to the top of the cabinet, then to the left past cooling coils 21 whereby the air is cooled. The air continuing to the left enters the pipe 23, which is connected to the end 13 of the cabinet and to the blower 17. Air entering the cabinet by way of the pipe 19 flows to the left between pans 9 and 8 and then turns upwardly and flows to the left between pans 8 and 7 and then flows upwardly and flows to the right between pans 7 and 6 and then turns as indicated by the arrow 25 and flows to the left past the cooling coils 21 and enters the pipe 23 to return to the blower 17. The structure described defines two sinuous passageways within the cabinet and means for circulating air through said passageways, the latter being connected in parallel with the mentioned means. Instead of the updraft just described, downdraft may be employed.

The cooling or refrigerating coils 21 are subject to frosting, which will cut down their efficiency as a cooling means. To eliminate or prevent the frosting, cleaner pipes 27 are provided, these having apertures 28' running lengthwise of the bottom so that brine or other fluid pumped into the pipes 27 from an exterior source may pass through the apertures or slots 28' and drop onto the coils 21 to remove the frost therefrom, the brine or other liquid then dropping into the pan 6 from which, if it rises above the level of the overflow pipe 28, it flows into the pan 7, from which it may flow into the pan 8 if it rises above the level of the overflow pipe 29 provided in the pan 7, and so on to pans below, eventually reaching pan 35 which extends from one end of the cabinet to the other and is deeper than the other pans, overflow pipes 30, 31, 32 and 33 being respectively provided for the pans 8, 9, 10 and 11. The mentioned overflow pipes are in staggered relation, or in other words, alternate pans have their respective overflow pipes adjacent similar ends while the other pans have their overflow pipes adjacent opposite ends, whereby a flow of liquid is obtained in each pan substantially from one end of the same to the other end, thus promoting the efficiency of the apparatus. The overflow pipes are adjustable in height for a purpose hereinafter mentioned.

Refrigerating tubes or coils 38 are placed in the mentioned pans and are connected at their ends to headers 39 and 40, these headers being connected to a brine tank which may be located in any desired place or position. Brine, which may be sodium or calcium brine for example, is pumped from the mentioned tank to either the header 39 or 40, then through the coils 38 and out through the other header back to the brine tank. The coils 38 are similar in cross-section to the coil 27 shown in Fig. 4, the coils 38 however not having apertures or slots in their bottoms as the coils 27 have. The coils 38 have relatively broad upper surfaces so that the object to be refrigerated may have a comparatively large contact area with the refrigerating coils. The mentioned coils are herein shown as having flat comparatively wide upper surfaces and as having sides converging downwardly. By providing refrigerating coils having wide upper surfaces, the cooling takes place more quickly and more efficiently, as will be readily appreciated. The fact that the coils have converging sides adds the further advantage that more space is provided for the circulation of the brine in the pans. The height of the coils 38 is less than that of the pans in which they lie so that, when necessary, the coils may be entirely submerged in the brine of the pans for the purpose of defrostation. Normally however the coils are only partially immersed in the brine of the pans, this partial immersion being usually sufficient to keep the coils from becoming frosted, as explained in my co-pending application above identified.

Means are provided for defrosting the mentioned pans, said means being herein shown as spraying means designated by the numerals 40'. The means just mentioned are adapted to spray brine on the bottoms of the pans to defrost the same, whereby the efficiency of the apparatus is maintained. Means are also provided for defrosting the top and the sides of the cabinet 5, these means being herein shown as spraying means 42 adapted to spray brine onto the top and the sides of the cabinet. In lieu of the spraying means 40' and 42, comparatively warm air may be blown through the air passageways by means of the blower 17 in order to defrost the pans and the interior of the cabinet. Baffles 21' are fastened to the air cooling coils 21 to secure a proper distribution of air on the surface of the cooling coils.

What is claimed as new and useful is:

1. In a freezing apparatus, a pan, a refrigerating coil disposed in said pan and composed of a tubular conductor carrying a refrigerant, the sections of said coil having flat top faces all disposed in a common plane with the adjacent edges of the sections in close proximity to each other, and a loose refrigerant in the pan in contact with the sections of the coil below the flat top faces.

2. In a freezing apparatus, a pan, a refrigerating coil disposed in said pan and composed of a tubular conductor carrying a refrigerant, the sections of said coil having flat top faces all disposed in a common plane with the adjacent edges of the sections in close proximity to each other, and a loose refrigerant in the pan in contact with the sections of the coil below the flat top faces, the tubular conductor of which the coil is formed being cross-sectionally triangular.

3. In a freezing apparatus, a cabinet, a series of vertically spaced pans arranged in said cabinet, refrigerating coils in said pans, and defrosting means comprising a series of tubular conductors and spray nozzles connected with said conductors and discharging onto the interior surface of the cabinet and the surfaces of the pans.

4. In a freezing apparatus, a cabinet, a partition disposed in the cabinet but spaced from the rear wall thereof, a series of vertically spaced pans arranged in the cabinet and of a width corresponding to the width of the same but of a length less than the length of the cabinet, alternate pans having their ends abutting the front wall of the cabinet and the intervening pans having their ends abutting some against the rear wall of the cabinet and some against said partition, whereby the pans are arranged in two batteries defining sinuous passages for air currents, said passages being in communication with each other at the upper end of the cabinet, and air circulating means having its intake at the upper end of the cabinet and its discharge connected with said air passages in parallel.

EDWARD JOSEPH MURPHY.